United States Patent [19]

O'Reagan

[11] 4,182,566
[45] Jan. 8, 1980

[54] SHUTTER RELEASE MECHANISM

[75] Inventor: James R. O'Reagan, Charlottesville, Va.

[73] Assignee: Eastman Kodak Company, Rochester, N.Y.

[21] Appl. No.: 867,562

[22] Filed: Jan. 6, 1978

[51] Int. Cl.² ........................................... G03B 17/38
[52] U.S. Cl. .................................. 354/268; 354/266
[58] Field of Search ............... 354/266, 268, 204, 207, 354/267, 269, 209

[56] References Cited

U.S. PATENT DOCUMENTS

| 2,742,835 | 4/1956 | Owens | 354/206 |
| 2,865,272 | 12/1958 | Deffenbaugh et al. | 354/204 |
| 3,590,703 | 7/1971 | Ono | 354/201 |
| 3,690,228 | 3/1970 | Yamashita et al. | 354/49 |
| 4,119,987 | 10/1978 | Beach | 354/268 |

FOREIGN PATENT DOCUMENTS 1123906 2/1962 Fed. Rep. of Germany ........... 354/204

Primary Examiner—L. T. Hix
Assistant Examiner—Shelley Wade
Attorney, Agent, or Firm—Roger A. Fields

[57] ABSTRACT

In a camera, a motion transmitting member has a wedge-shaped end portion inserted between a shutter release member and a shutter restraining member. Manual depression of the release member pivots the motion transmitting member, which moves the restraining member to free the camera shutter for exposure. A spring member urges the motion transmitting member to maintain its wedge-shaped end portion in mutual contact with the release and restraining members. The spring-urging automatically adjusts the position of the motion transmitting member between the release and restraining members to compensate for wear of their contacting surface portions and substantially prevents any lost motion or lag between manual depression of the release member and movement of the restraining member to enable shutter actuation. Following shutter actuation, manual movement of a film member causes an extracting member to remove the motion transmitting member from between the release and restraining members. As a result, the release member cannot effect shutter actuation during film advance, even though it is still able to be manually depressed.

5 Claims, 8 Drawing Figures

SHUTTER RELEASE MECHANISM

BACKGROUND OF THE INVENTION

1. Field of the Invention

The present invention relates generally to photography, and more particularly to shutter release mechanisms for cameras.

2. Description of the Prior Art

Those versed in the prior art dealing with shutter release mechanisms for still picture cameras are aware of the lost motion or free play which may be sensed by the camera operator during the initial stage of manually depressing a shutter release member to initiate actuation of the camera shutter. This lost motion often takes the form of a lag between the movement of the shutter release member and that of a restraining member which is movable by the release member to free the camera shutter or a shutter drive member for actuation. While at times such lost motion may be intentionally provided for in a shutter release mechanism, for example, to enable initial depression of the shutter release member to cause a visible signal to be displayed when the level of available light is unsuitable for a proper exposure; at other times such lost motion is not desired, for example, where design compactness is necessary as in a short-stroke shutter release mechanism or in a compact or pocket-type camera. With prolonged use of the shutter release mechanism, the measure of lost motion or lag between the successive movements of the shutter release member and the restraining member ordinarily increases owing to the wear between contacting surface portions of these members. Such wear, therefore, can cause delayed shutter actuation and may eventually result in mechanical failure of the shutter release mechanism.

When it is desired to prevent actuation of the camera shutter, usually to avoid double exposure or because the level of available light is unsuitable for a proper exposure, it is known to either lock the shutter release member to prevent its manual depression or to display a visible signal in the camera viewfinder during the initial stage of manually depressing the shutter release member. However, there are general disadvantages to these designs. In the first instance, the release lock increases the chance of camera damage through undue pressure being applied to the release member by the camera user; whereas, in the second instance, the use of a visible signal is not a positive means of preventing shutter actuation. One recent design which may avoid these disadvantages is disclosed in U.S. Pat. No. 3,690,228, granted Sept. 12, 1972, in the names of Yamashita et al. According to the Yamashita patent, a shutter release member is normally connected by way of an interlocking member to a latch member which operates to restrain a shutter drive member. During the initial stage of manually depressing the shutter release member, the position of an exposure meter pointer is detected by mechanical means. If the pointer is located outside an automatic exposure range, the interlocking member is disconnected from the shutter release member and the latch member. As a result, the release member cannot actuate the camera shutter even though it is still able to be depressed. While this more recent design may be considered in some ways to represent an improvement over the other prior art examples discussed, it is subject to mechanical failure because of the detailed mechanical relation between the exposure meter pointer and the means for disconnecting the interlocking member from the shutter release and latch members.

SUMMARY OF THE INVENTION

The previously described problems and other problems associated with prior art shutter release mechanisms are believed solved in accordance with the present invention. In particular, the shutter release mechanism of the present invention operates to substantially prevent any lost motion or lag between the successive movements of its members and is self-adjusting to automatically compensate for wear between contacting surface portions of these members. Moreover, the shutter release mechanism of the present invention is provided with a much simplified means for preventing undesired shutter actuation.

In a preferred embodiment of the present invention, a motion transmitting member has a wedge-shaped end portion inserted between a shutter release member and a shutter restraining member. Manual depression of the release member pivots the motion transmitting member, which moves the release member to free the camera shutter for exposure. A spring member urges the motion transmitting member to maintain its wedge-shaped end portion in mutual contact with the release and restraining members. The spring urging automatically adjusts the position of the motion transmitting member between the release and restraining members to compensate for wear of their contacting surface portions and substantially prevents any lost motion or lag between manual depression of the release member and movement of the restraining member to enable shutter actuation.

According to another feature of the preferred embodiment, manual movement of a film advance member, following shutter actuation, causes an extracting member to remove the motion transmitting member from between the shutter release and shutter restraining members. As a result, by a relatively simple mechanical arrangement the release member is prevented from initiating shutter actuation during film advance, even though it is still able to be manually depressed.

BRIEF DESCRIPTION OF THE DRAWINGS

For a more complete understanding of the present invention, as well as further advantages and features thereof, reference should be had to the following detailed description of the invention taken in conjunction with the accompanying drawings, in which.

DESCRIPTION OF THE PREFERRED EMBODIMENT

Figure 1:
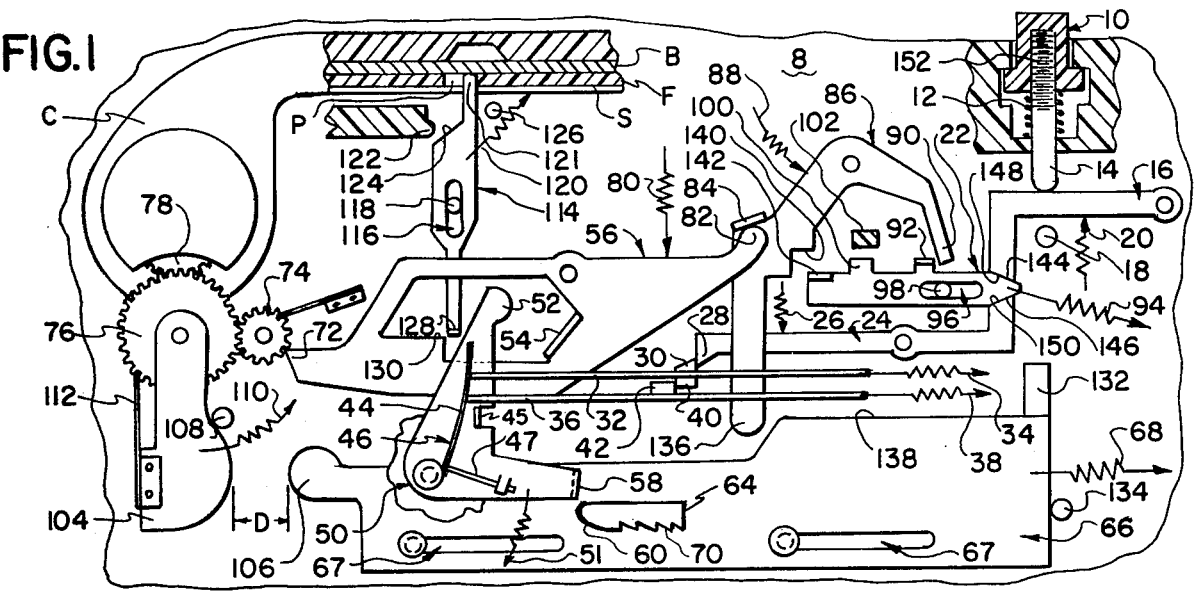
FIG. 1 is an elevational view of a camera shutter release and film metering mechanism in accordance with a preferred embodiment of the present invention, showing such mechanism in readiness for initiating shutter actuation when a film cartridge is loaded in the camera.

Referring now to the drawings, there is shown a shutter release and film metering mechanism in a cartridge loading still picture camera. Various members of the shutter release and film metering mechanism are shown in several of the Figs., both in solid line and broken line versions, in order to depict their sequential movements. In the several Figs., the broken line version of a member depicts its former position, whereas the solid line version depicts its present position.

OPERATION

For the sake of clarity, the preferred embodiment will be described in terms of its operation when a film cartridge C has been loaded in a still picture camera having a partially shown housing 8. Viewing FIGS. 1 and 2, it will be observed that manual depression of a shutter release button 10 in opposition to the upward urging of a button return spring 12, moves a pin 14 downwardly. The moved pin 14 pivots a shutter release lever 16 counterclockwise against a stop 18 in opposition to the clockwise urging of a lever return spring 20. In turn, the pivoted release lever 16 swings a motion transmitting or coupling wedge 22 clockwise, which pivots a shutter restraining latch 24 clockwise in opposition to the counterclockwise urging of a latch return spring 26. A latching finger 28, located on the pivoted shutter restraining latch 24, is then separated from a boss 30 which projects from a shutter opening blade 32. This releases the opening blade 32, which is then pulled by an actuating spring 34 to the right, as viewed in FIG. 2. A shutter closing blade 36 is similarly pulled by an actuating spring 38 to immediately follow the shutter opening blade 32. The timed relation between the opening and closing blades 32 and 36 is maintained by two contacting bosses 40 and 42 which respectively depend and project from the opening and closing blades.

Figure 2:
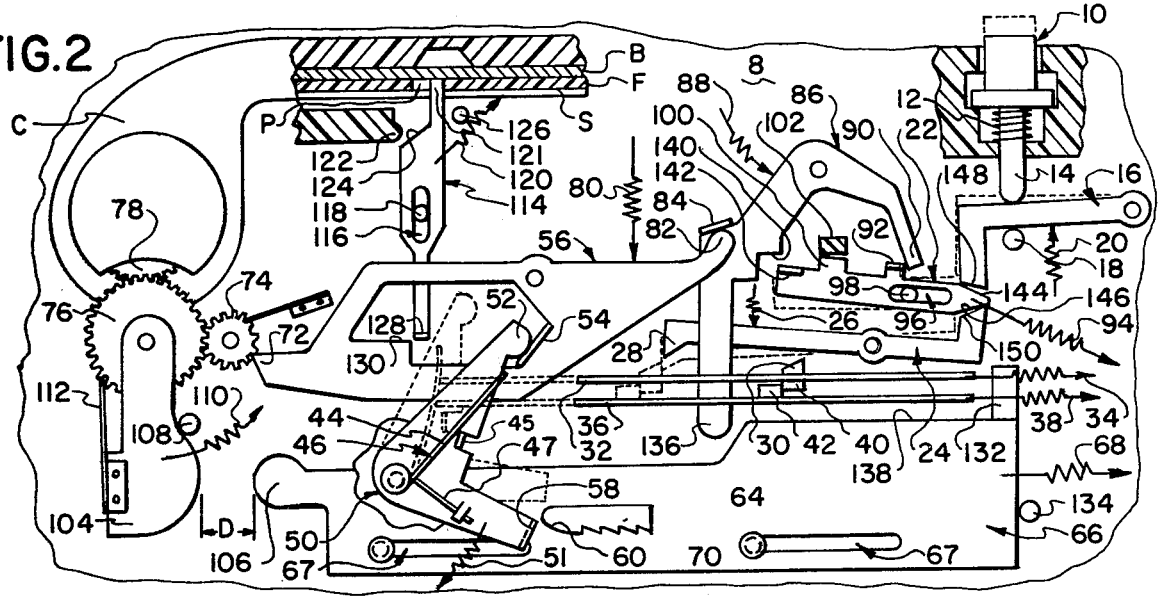
FIG. 2 is an elevational view of the mechanism showing the relative positions of its members after a pair of opening and closing shutter blades have been released to expose a single film frame in the cartridge.

When the shutter opening and closing blades 32 and 36 are moved to the right, as viewed in FIG. 2, they cease to restrain a flexed leg 44 of a torsion spring 46, whose other leg 47 is fixed to an anti-short stroke or blocking lever 50. Release of the flexed spring leg 44 permits a relatively weak position spring 51 to pivot the anti-short stroke lever 50 clockwise, as viewed in FIG. 2, until a lever end finger 52 is blocked by a right-angle tab 54 of a locking or metering lever 56. When the anti-short stroke lever 50 is stopped from pivoting, a lever end pawl 58 will be located adjacent to a curved leading edge 60 of a saw-tooth pad 64. As shown in FIG. 2, the saw-tooth pad 64 is fixed to a film advance slide 66 which is supported for manual movement by two pin-in-slot couplings 67. Consequently, if, as viewed in FIG. 3, the film advance slide 66 is manually moved to the left a slight amount, in opposition to the rightward urging of a slide return spring 68, the camming action of the pad's curved leading edge 60 against the end pawl 58 of the anti-short stroke lever 50 will further pivot such lever clockwise. This locates the lever end pawl 58 beneath the pad 64 and in engagement with the first of a series of pad ratchet teeth 70. Such engagement, it will be observed, prevents the film advance slide 66 from being pulled to the right by the slide return spring 68.

Figure 3:
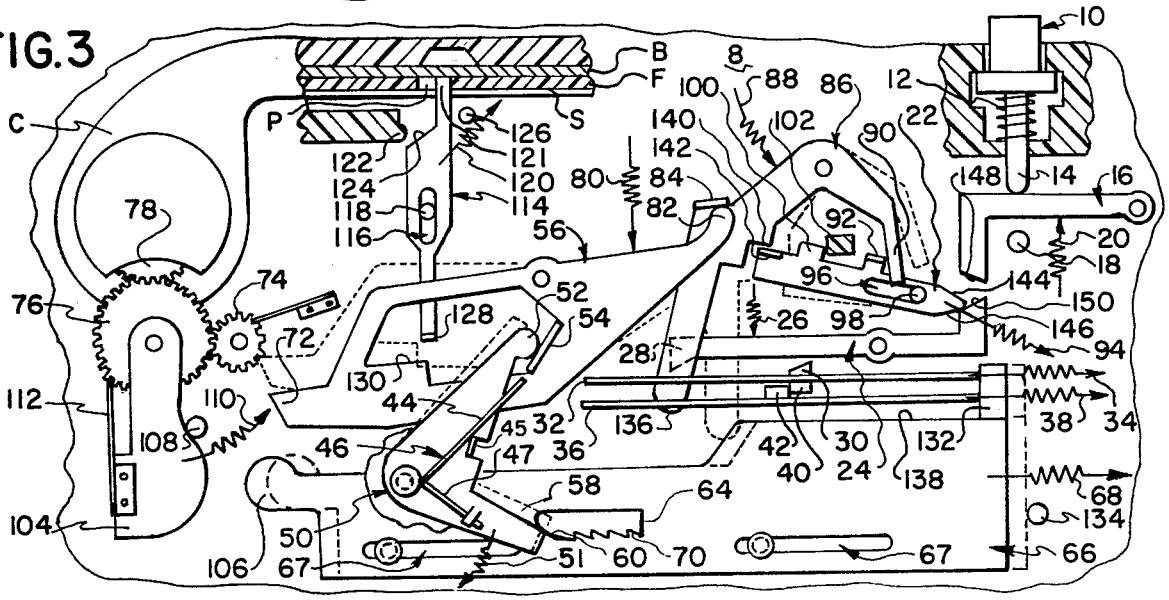
FIGS. 3 and 4 are elevational views of the mechanism showing its operation during the initial stroke of a film advance slide.

Before a film strip F in the cartridge C can be advanced by further moving the film advance slide 66 to the left, a locking finger 72 of the locking lever 56 must first be disengaged from an anti-reverse gear 74. As shown in FIG. 2, the anti-reverse gear 74 is in mesh with a driven film advance gear 76 which, in turn, is in mesh with a take-up gear 78 in the cartridge C. Such an arrangement enables the locking lever 56, when in the illustrated locking position of FIG. 2, to prevent any film advancement. Disengagement of the locking finger 72 from the anti-reverse gear 74 is accomplished, as shown in FIG. 3, by initially moving the film advance slide 66 to the left. The resultant clockwise pivoting of the anti-short stroke lever 50 causes its end finger 52 to push against the right-angle tab 54 of the locking lever 56, pivoting the locking lever counterclockwise from its locking position in opposition to the clockwise urging of a lever return spring 80. As a result, the locking finger 72 is separated from the anti-reverse gear 74.

It will be observed that the force of the return spring 80 for the locking lever 56 serves to maintain the end pawl 58 of the anti-short stroke lever 50 in engagement with successive ones of the pad ratchet teeth 70 when the film advance slide 66 is further moved to the left to advance the film strip F.

When the locking lever 56 is pivoted counterclockwise from its locking position in response to initial movement of the film advance slide 66 to the left, as in FIG. 3, a lever end finger 82 pushes against a right-angle tab 84 of an extracting lever 86. This pivots the extracting lever 84 clockwise in opposition to the counterclockwise urging of a lever return spring 88. In turn, an extracting finger 90 of the pivoted extracting lever 86 pushes against a right-angle tab 92 of the motion transmitting wedge 22. At the same time, a positioning spring 94 exerts a clockwise turning force on the wedge 22; whereas, a pin-in-slot coupling 96 enables the wedge to pivot clockwise about a mounting pin 98 and, simultaneously, to slide to the left. This, as shown in FIG. 3, permits the pivoted extracting finger 90 to remove the wedge 22 from between the shutter release lever 16 and the shutter restraining latch 24 and to locate a locking finger 100 of the wedge behind a fixed stop 102. Consequently, the extracting finger 90 and the fixed stop 102 prevent the wedge 22 from returning to between the shutter release lever 16 and the shutter restraining latch 24, which allows the release button 10 to be manually depressed (during the film advance operation shown in FIGS. 4, 6 and 7) without any resultant pivoting of the shutter restraining latch to release the opening and closing shutter blades 32 and 36.

Figure 4:
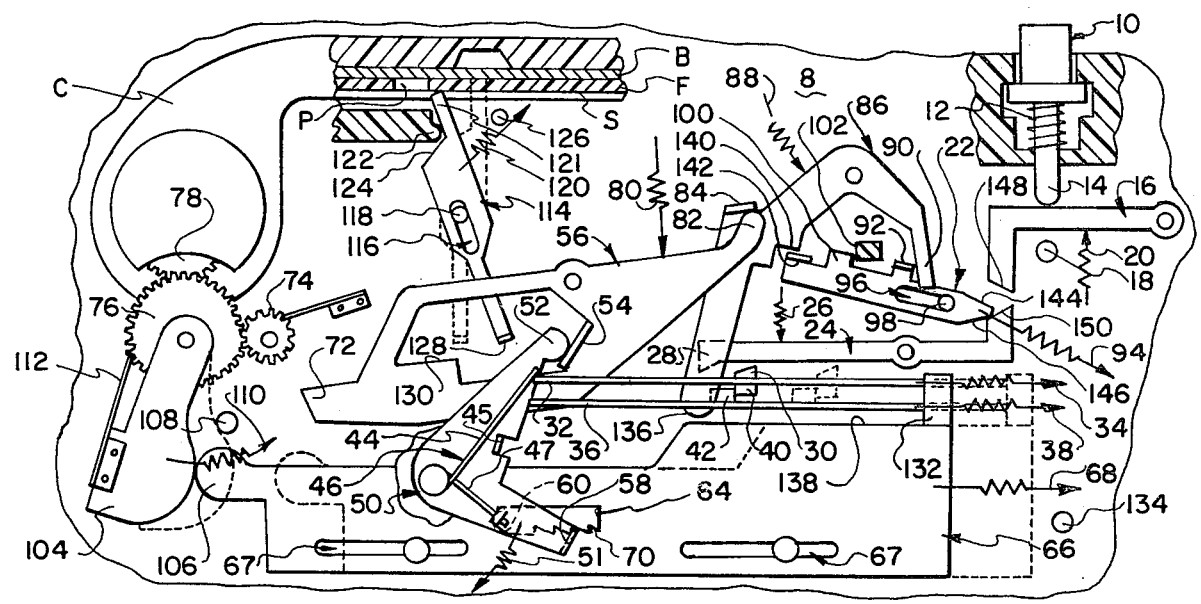

Referring again to FIG. 2, it can be seen that a film drive sector 104 is normally spaced from an actuator or push member 106 of the film advance slide 66 by an initial or lead distance D. Such lead distance D enables the slide 66 to be manually moved to the left to disengage the locking finger 72 from the anti-reverse gear 74 before the slide's actuator member 106 pushes against the film drive sector 104 to advance the film strip F. As shown in FIG. 4, when the slide's actuator member 106 pivots the drive sector 104 clockwise from a stop 108, in opposition to the counterclockwise urging of a sector return spring 110, the drive sector by means of a drive clip 112 will rotate the driven gear 76 clockwise. The rotated gear 76, in turn, rotates the take-up gear 78 counterclockwise in the cartridge C to draw the film strip F to the left onto a cartridge takeup spool (not shown).

Figure 5:
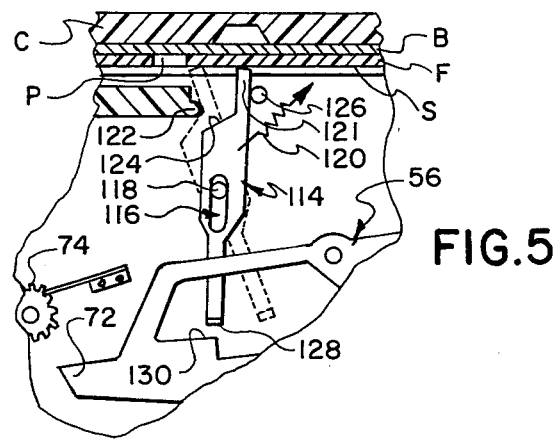
FIG. 5 is an elevational view of a film sensing pawl shown in FIGS. 1-4.

A film sensing pawl 114, by means of a pin-in-slot coupling 116, is mounted for pivotal and sliding movement with respect to a mounting pin 118. As shown in FIG. 3, a return spring 120 urges an upper or film engaging end 121 of the pawl 114 through a film perforation P and lightly against a non-perforated film backing paper B in the cartridge C. When the film strip F is initially advanced to the left, as shown in FIG. 4, the sensing pawl 114 is pivoted counterclockwise by the advanced film strip in opposition to the clockwise urging of the return spring 120. A cam rib 122 directs a shoulder 124 of the pivoted pawl 114 downwardly to remove the pawl end 121 from the film perforation P; whereupon, as shown in FIG. 5, the return spring 120 pivots the pawl clockwise until the pawl hits a stop 126. The pawl 114 comes to rest with its upper end 121 held lightly against the film surface S by the return spring 120 and with a right-angle tab 128 of the pawl slightly spaced from an edge 130 of the locking lever 56.

Figure 6:
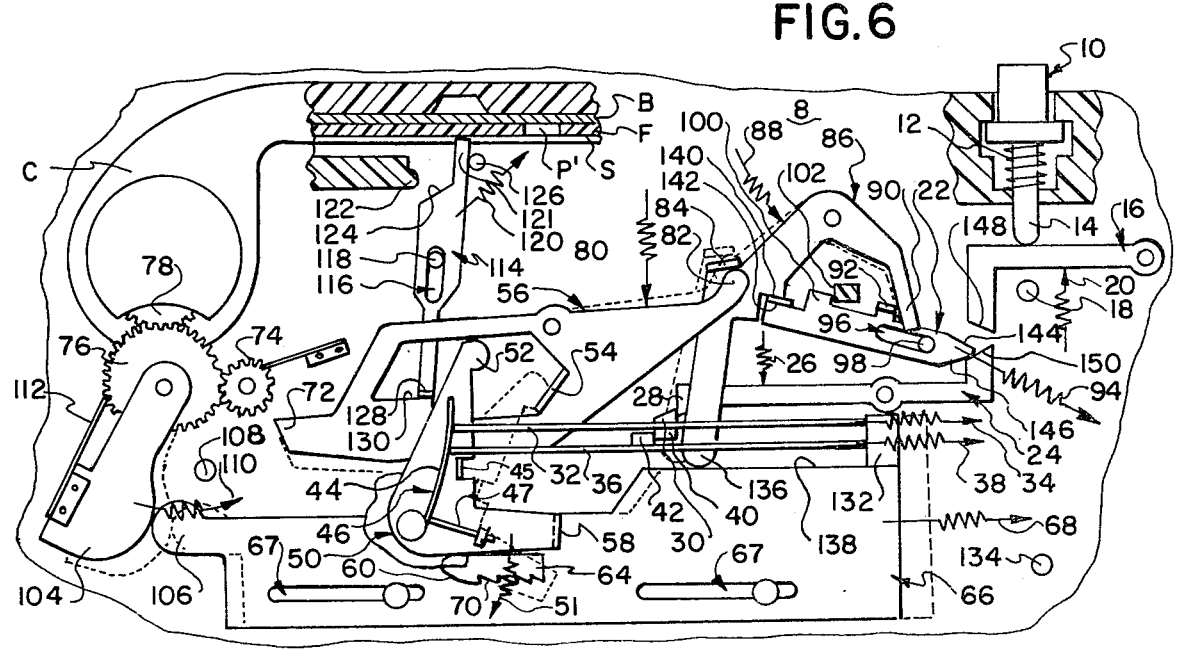
FIG. 6 is an elevational view of the mechanism showing the relative positions of its members just prior to completion of the initial stroke of the film advance slide.

Near the end of its initial or first stroke, the film advance slide 66 recocks the opening and closing shutter blades 32 and 36, as shown in FIG. 6. This is accomplished by means of an offset finger 132 of the slide 66, which pushes the opening and closing blades 32 and 36 to the left until the boss 30 of the opening blade is re-engaged by the latching finger 28 of the shutter restraining latch 24. When the blades 32 and 36 are moved to the left, they again push against and thus flex the torsion spring leg 44, whose other leg is fixed to the anti-short stroke lever 50. At this time, the anti-short stroke lever 50 cannot be pivoted counterclockwise by the torsion spring 46 since the lever end pawl 58 is engaging the last one of the pad ratchet teeth 70. However, when the film advance slide 66 is further manually moved to the left a slight amount to complete its first stroke, the last one of the pad ratchet teeth 70 clears the lever end pawl 58; whereupon, as shown in FIG. 6, the anti-short stroke lever 50 is pivoted counterclockwise by the flexed torsion spring 46 to its initial or starting orientation, shown in FIG. 6. This permits the return spring 68 to pull the film advance slide 66 to the right against a stop 134. Counterclockwise pivoting of the anti-short stroke lever 50 to its initial orientation separates the lever end finger 52 from the right-angle tab 54 of the locking lever 56. As a result, the locking lever 56 is pivoted slightly clockwise by its return spring 80, with the lever edge 130 coming to rest against the right-angle tab 128 of the film sensing pawl 114. By means of the sensing pawl 114, therefore, the locking finger 72 is prevented from re-engaging the anti-reverse gear 74, and the motion transmitting wedge 22 is prevented from returning to between the shutter release lever 16 and the shutter restraining latch 24.

Figure 7:
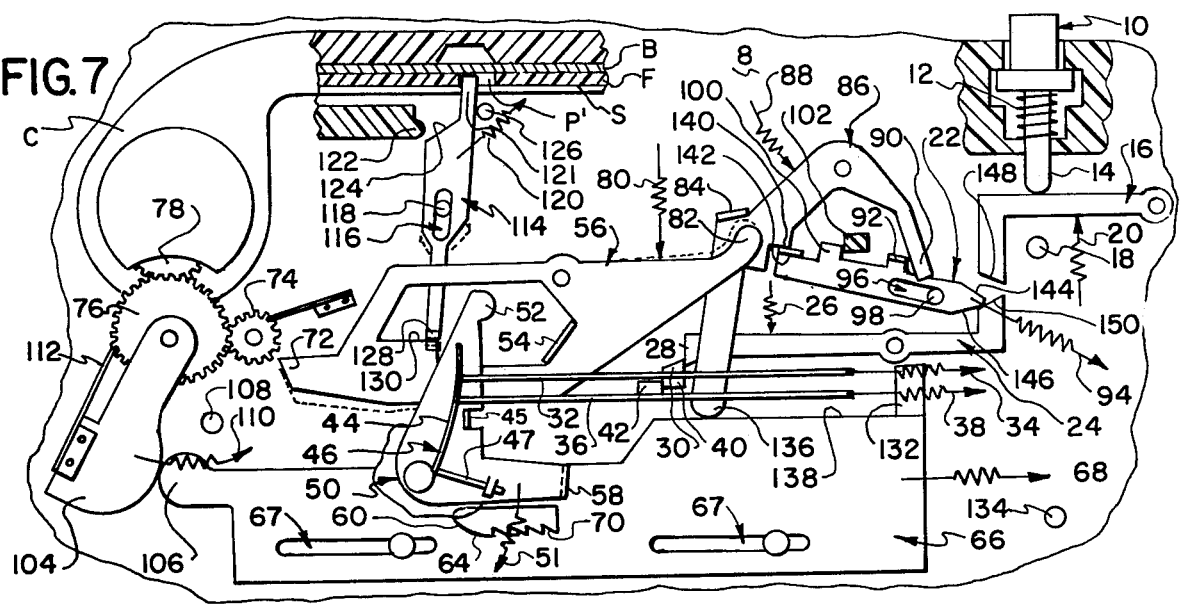
FIG. 7 is an elevational view of the mechanism showing the relative positions of its members during the second or final stroke of the film advance slide.

During the second or final stroke of the film advance slide 66 to the left, as viewed in FIG. 7, the film drive sector 104 is again pivoted clockwise from its stop 108 by the slide's actuator member 106 in order to further advance the film strip F to the left. Since the shutter blades 32 and 36 now cannot be actuated by manually depressing the shutter release button 10, the anti-short stroke lever 50 must remain in its initial orientation out of engagement with the pad ratchet teeth 70. Near the end of the second stroke of the film advance slide 66, a film perforation P', which is spaced from the film perforation P by a single frame length, is moved to the left immediately above the upper end 121 of the film sensing pawl 114; whereupon, the sensing pawl is urged upwardly by its return spring 120, causing the pawl end 121 to move through the film perforation P' and come to rest lightly against the film backing paper B. Raising the sensing pawl 114 in this manner enables the return spring 80 to pivot the locking lever 56 clockwise until the lever edge 130 is again restrained by the sensing pawl tab 128, as shown in FIG. 7. At this time, the locking finger 72 will be slightly spaced from the anti-reverse gear 74. Thereafter, when the film advance slide 66 is further manually moved to the left a slight amount to complete its second stroke, the film perforation P' will be leftwardly advanced a corresponding amount to a location formerly occupied by the film perforation P in FIG. 1. Such movement of the film perforation P' pivots the film sensing pawl 114 slightly counterclockwise to the vertical or initial orientation, shown in FIG. 1; whereupon, the sensing pawl tab 128 is moved clear of the locking lever edge 130, enabling the return spring 80 to pivot the locking lever 56 slightly clockwise to the locking position in which its locking finger 72 re-engages the anti-reverse gear 74 to prevent further film advance. Although at this time the end finger 82 of the locking lever 56 has separated from the right-angle tab 84 of the extracting lever 86, as shown in FIG. 7, the extracting lever is prevented from being pivoted counterclockwise by its return spring 88 since an arm member 136 of such lever is blocked by an edge 138 of the film advance slide 66. However, at the end of its second stroke, the film advance slide 66 is returned to the right against the stop 134 by the slide return spring 68. This causes the slide edge 138 to move clear of the lever arm 136; whereupon, the extracting lever 86 is pivoted counterclockwise by its return spring 88 until the lever tab 84 again comes to rest against the end finger 82 of the locking lever 56, as shown in FIG. 1. As the extracting lever 86 is pivoted counterclockwise, a cam edge 140 of such lever pushes against a right-angle tab 142 of the motion transmitting wedge 22 to remove the locking finger 100 of such wedge from behind the fixed stop 102. Then, the positioning spring 94 draws the motion transmitting wedge 22 to the right, snugly between the shutter release lever 16 and the shutter restraining latch 24, as in FIG. 1, enabling the shutter actuation and film metering operations depicted in FIGS. 1–7 to be repeated, when desired.

Referring again to FIGS. 1 and 2 to consider certain details of the preferred embodiment of the present invention, it will be seen that the motion transmitting wedge 22 has a pair of oppositely arranged tapered edge portions 144 and 146, which respectively cooperate with inclined edge portions 148 and 150 of the shutter release lever 16 and the shutter restraining latch 24 to enable such wedge to be seated or snugly fit between the release lever and the restraining latch. Owing to this snug fit, which is continuously maintained by the positioning spring 94 biasing the wedge 22 downwardly to the right, as viewed in FIGS. 1 and 2, movement of the release lever 16 is transmitted by the wedge to the restraining latch 24 substantially without any lost motion or free play arising between these members. Moreover, the pin-and-slot coupling 96, which supports the wedge 22 for pivotal movement about the mounting pin 98, as well as for sliding movement between the release lever 16 and the restraining latch 24, enables the positioning spring 94 to automatically adjust the position of the wedge between the release lever and the restraining latch to compensate for any wear between the contacting edge portions 144, 148 and 146, 150 of the wedge, the release lever and the restraining latch.

Considering another feature of the preferred embodiment, it will be seen in FIG. 1 that the shutter release button 10 is coupled to the pin or trigger 14 by a threaded portion 152. As a result, the pin 14 may be adjusted to slightly separate it from the shutter release lever 16 when, for example, some degree of free play is desired for a low light indicator or a battery check.

DEMONSTRATION

Figure 8:
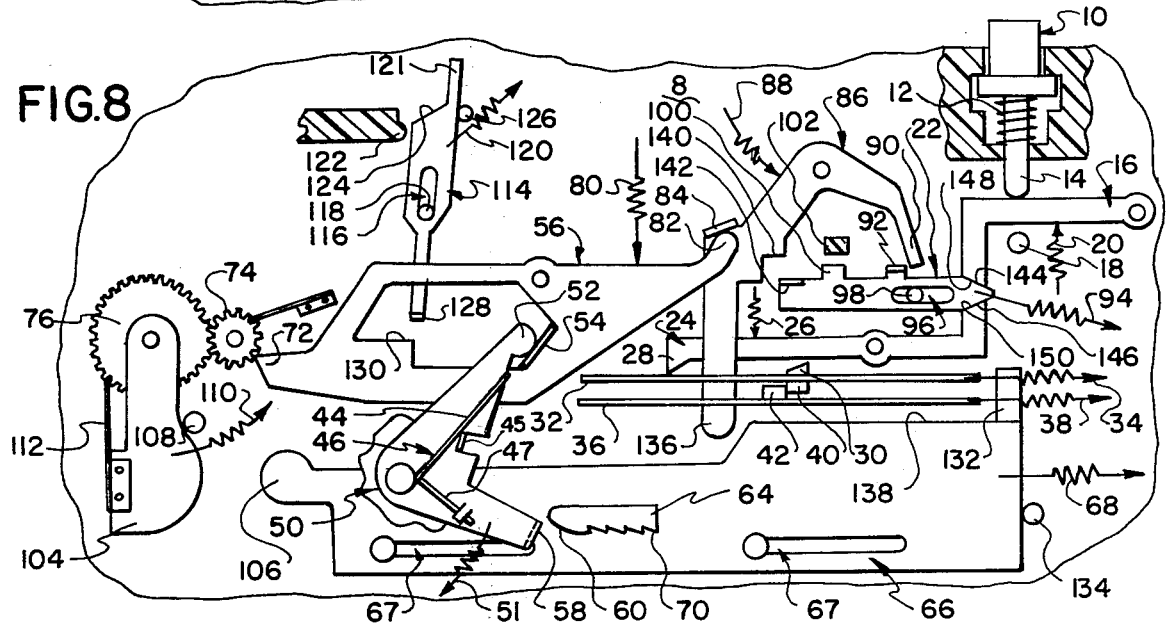
FIG. 8 is an elevational view of the mechanism when a film cartridge is not loaded in the camera and the opening and closing shutter blades have been released.

FIG. 8 shows the shutter release and film metering mechanism when a film cartridge is not loaded in the camera housing 8, and the shutter opening and closing blades 32 and 36 have been actuated, i.e., moved to the right from the torsion spring leg 42, following manual depression of the shutter release button 10. If the film advance slide 66 is now moved to the left to recock the shutter blades 32 and 36, it will be recalled that the anti-short stroke lever 50, which is then pivoted slightly clockwise by the curved leading edge 60 of the slide pad 64, will swing the locking lever 56 counterclockwise from its locking position to disengage the locking finger 72 from the anti-reverse gear 74. During the first stroke of the film advance slide 66 to the left, the end pawl 58 of the anti-short stroke lever 50 engages successive ones of the pad ratchet teeth 70. This, it will be recalled, prevents the film advance slide 66 from being returned to the right by its return spring 68 until the slide has completed its first stroke. After completion of the first stroke, since the film sensing pawl 114 in the absence of a film cartridge in the camera is urged upwardly by its return spring 120 to traverse the exposure plane otherwise occupied by a film strip, the right-angle tab 128 of the sensing pawl will remain spaced from the edge 130 of the locking lever 56. As a result, the locking lever 56, when released by the anti-short stroke lever 50, will pivot clockwise until its locking finger 72 re-engages the anti-reverse gear 74, preventing a second stroke of the film advance slide 66 until after the shutter blades 32 and 36 have again been actuated by manual depression of the shutter release button 10. This feature of requiring the shutter blades 32 and 36 to be actuated each time a single, rather than a double, stroke of the film advance slide 66 is completed, when there is no film cartridge in the camera, easily permits the camera mechanism to be demonstrated or tested without the necessity of loading a film cartridge in the camera.

The invention has been described in detail with particular reference to the preferred embodiment thereof, but it will be understood that variations and modifications can be effected within the spirit and scope of the invention.

I claim:

1. In a shutter release mechanism of the kind wherein a manually operable member is movable to initiate shutter actuation, a restraining member is movable from a restraining position for preventing shutter actuation to a releasing position for allowing shutter actuation, and a motion transmitting member is movable to transmit movement of said manually operable member to said restraining member for moving said restraining member from its restraining position to its releasing position, the improvement comprising:

said motion transmitting member including a wedge-shaped portion; and spring means connected to said motion transmitting member for moving said wedge-shaped portion into wedging contact with said manually operable and restraining members to substantially prevent any lost motion between the respective movements of the two members for shutter actuation.

2. The improvement as recited in claim 1, wherein said spring means is directly connected to said wedge-shaped portion of said motion transmitting member for drawing said wedge-shaped portion between said manually operable and restraining members to maintain wedging contact therewith.

3. In a shutter release mechanism of the kind wherein a manually operable member is movable to initiate shutter actuation, a restraining member is movable from a restraining position for preventing shutter actuation to a releasing position for allowing shutter actuation, and a motion transmitting member is movable to transmit movement of said manually operable member to said restraining member for moving said restraining member from its restraining position to its releasing position, the improvement comprising:

said motion transmitting member including a wedge-shaped portion; and spring means connected to said motion transmitting member for firmly wedging said wedge-shaped portion between said manually operable and restraining members to normally bias the two members apart and substantially prevent any lost motion between their respective movements for shutter actuation.

4. In a shutter release mechanism of the kind wherein a manually operable member is movable to initiate shutter actuation, a restraining member is movable from a restraining position for preventing shutter actuation to a releasing position for allowing shutter actuation, and a motion transmitting member is movable to transmit movement of said manually operable member to said restraining member for moving said restraining member from its restraining position to its releasing position, the improvement comprising:

said motion transmitting member including a wedge-shaped portion;

spring means connected to said motion transmitting member for moving said wedge-shaped portion into wedging contact with said manually operable and restraining members to substantially prevent any lost motion between the respective movements of the two members for shutter actuation; and mounting means pivotally and slidably supporting said motion transmitting member for enabling said spring means to substantially adjust the location of said wedge-shaped portion between said manually operable and restraining members for maintaining said wedge-shaped portion in wedging contact with said manually operable and restraining members.

5. In a shutter release mechanism of the kind wherein a manually operable member is movable to initate shutter actuation, a restraining member is movable from a restraining position for preventing shutter actuation to a releasing position for allowing shutter actuation, and a motion transmitting member is movable to transmit movement of said manually operable member to said restraining member for moving said restraining member from its restraining position to its releasing position, the improvement comprising:

said motion transmitting member including a wedge-shaped portion having a pair of oppositely arranged tapered edges;

said manually operable and restraining members having inclined edges which respectively cooperate with said tapered edges of said wedge-shaped portion for enabling said wedge-shaped portion to snugly fit in wedging contact between said manually operable and restraining members; and spring means connected to said wedge-shaped portion for moving said wedge-shaped portion into wedging contact with said manually operable and restraining members.

* * * * *

UNITED STATES PATENT OFFICE
CERTIFICATE OF CORRECTION

PATENT NO. : 4,182,566
DATED : January 8, 1980
INVENTOR(S) : James R. O'Reagan

It is certified that error appears in the above-identified patent and that said Letters Patent are hereby corrected as shown below:

| Column and Line in Printed Patent | Mistake Noted |
|---|---|
| ABSTRACT, line 17 | After "film" insert -- advance --. |
| Col. 8, line 53 | Before the word "adjust" delete the word "substantially" and insert -- automatically --. |

Signed and Sealed this

Twenty-fifth Day of March 1980

[SEAL]

Attest:

Attesting Officer

SIDNEY A. DIAMOND

Commissioner of Patents and Trademarks